Nov. 10, 1931.  A. K. HANKS  1,831,766
PICTURE PROJECTING APPARATUS
Filed Feb. 27, 1924  3 Sheets-Sheet 2

Nov. 10, 1931.  A. K. HANKS  1,831,766
PICTURE PROJECTING APPARATUS
Filed Feb. 27, 1924  3 Sheets-Sheet 3

INVENTOR
Austin K. Hanks
BY
Frank H. Ashley
ATTORNEY

Patented Nov. 10, 1931

1,831,766

UNITED STATES PATENT OFFICE

AUSTIN K. HANKS, OF FOREST HILLS, LONG ISLAND, NEW YORK, ASSIGNOR TO TRANS-LUX DAYLIGHT PICTURE SCREEN CORPORATION, OF NEW YORK, N. Y., A CORPORATION OF DELAWARE

PICTURE PROJECTING APPARATUS

Application filed February 27, 1924. Serial No. 695,419.

My invention relates to picture projection apparatus.

The object of my invention is to provide an improved apparatus by means of which images of opaque objects such as book pages, illustrations, photographs, post cards, engraved metal and carvings may be projected on a screen and viewed in an ordinary room in daylight.

A further object is to provide means whereby the display matter may be projected on a screen of translucent material known as a "day light" screen from the rear side in such manner that it will appear in its natural form and arrangement when viewed from the front or display side of the screen.

The invention also provides means whereby the ordinary transparent slides may also be used to project the picture to a display screen.

A further object is to provide means whereby the picture or photograph is protected from the heat generated by the lamps which are used to illuminate them.

This apparatus is especially adapted for use in connection with the type of screen known as a "daylight screen," because of the fact that projection with the screen is accomplished by placing the apparatus in the rear, and the picture viewed from the front, the optical arrangement being such that the characters of an ordinary printed page are reversed as regards right and left, the image of the word T H U S appearing S U H T when viewed from the position of the rear of the machine, that is, looking in the direction in which the light is projected, but is correct when viewed from the front, the image then appearing T H U S. In order to accomplish "opaque" projection with the daylight screen, it is necessary to employ illuminants of the highest efficiency, such as electric lamps of high candle power which are used in conjunction with reflectors of very high optical correction and efficiency in order to obtain sufficiently intense illumination in a limited space to make the use of the combination practical when viewed in an ordinary lighted room, or in daylight, as distinguished from darkness. By contrast, be it stated that the design of other apparatus constructed for "opaque" projection (of the educational type) and of the required optical corrections and efficiency, make their use in a darkened room, or in total darkness a necessity for best or even fair results. The screen must in any event be placed in such location as to be practically in total darkness. Also in all such apparatus of which I am aware, one plane surface mirror is used in conjunction with the projection objective, to reflect the optical image in order that book page, type matter, etc., may appear correct upon the ordinary screen, such as a canvas curtain or a plain wall.

The use of a combination of lamps and optically corrected reflections to obtain illumination of sufficient intensity to give practical results in conjunction with the screen in an ordinary lighted room was found to give so much heat as to render the apparatus impractical. Actual temperature tests proved that the temperature at the picture, a page of printed matter, reached 385° Fah. and over. This soon discolored and charred the page, and also overheated the apparatus. My invention provides a device in which a system of artificial ventilation is used which reduces the maximum temperature to such a degree that it is both safe and practical to leave a photograph, book page, or other illustration, in use in the apparatus for an indefinite period of time.

Referring now to the drawings which form a part of these specifications:—

Figure 1:
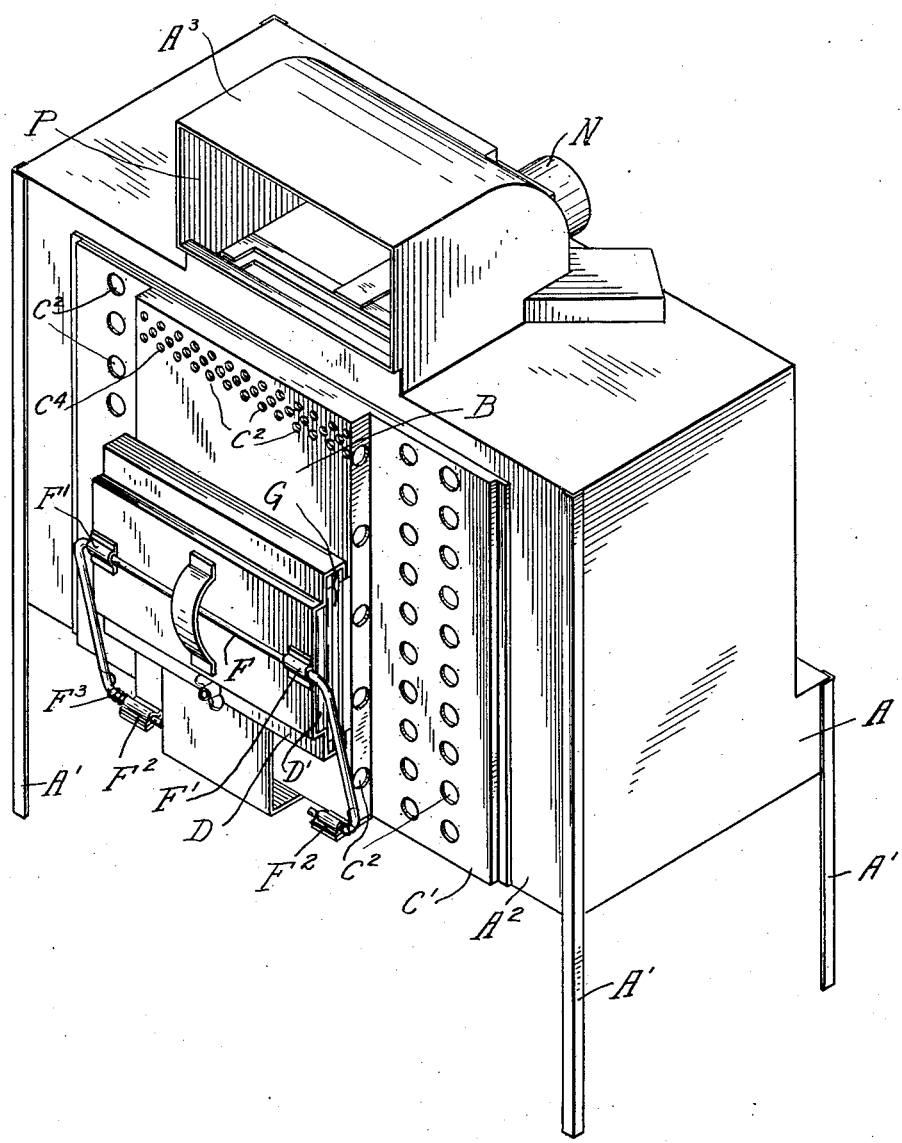
Figure 1 is a perspective view illustrating the outward appearance of the back, top and end portions of the apparatus.
Figure 2:
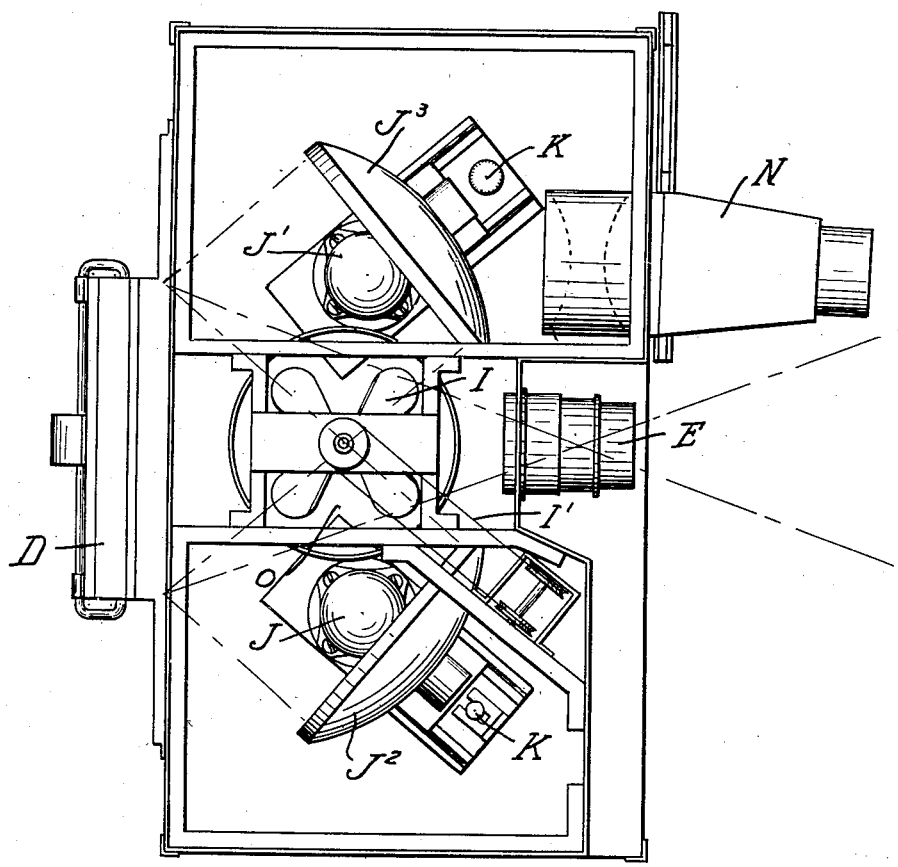
Figure 2 is a plan view, the top of the casing being removed to expose the interior arrangement of the parts.
Figure 3:
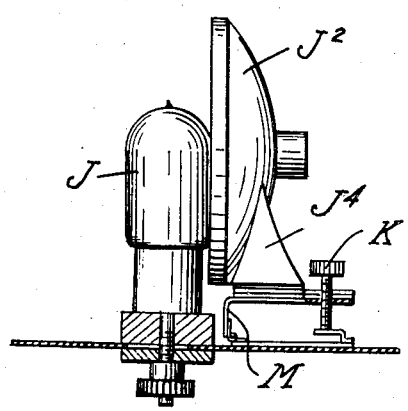

Figure 3 discloses a lamp and reflector and means by which the reflector is adjusted relative to the lamp.

Figure 4:
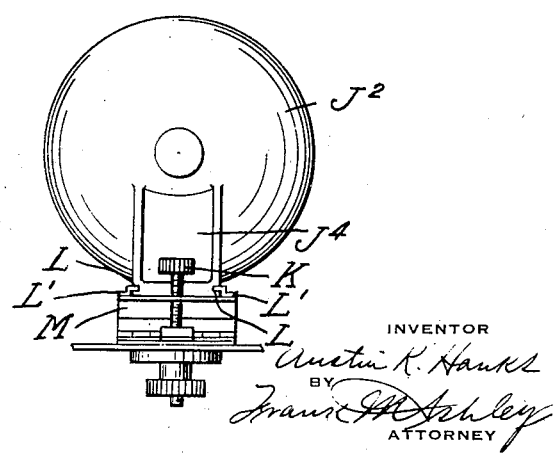

Figure 4 is a rear view of a reflector and its adjusting mechanism.

Figure 5:
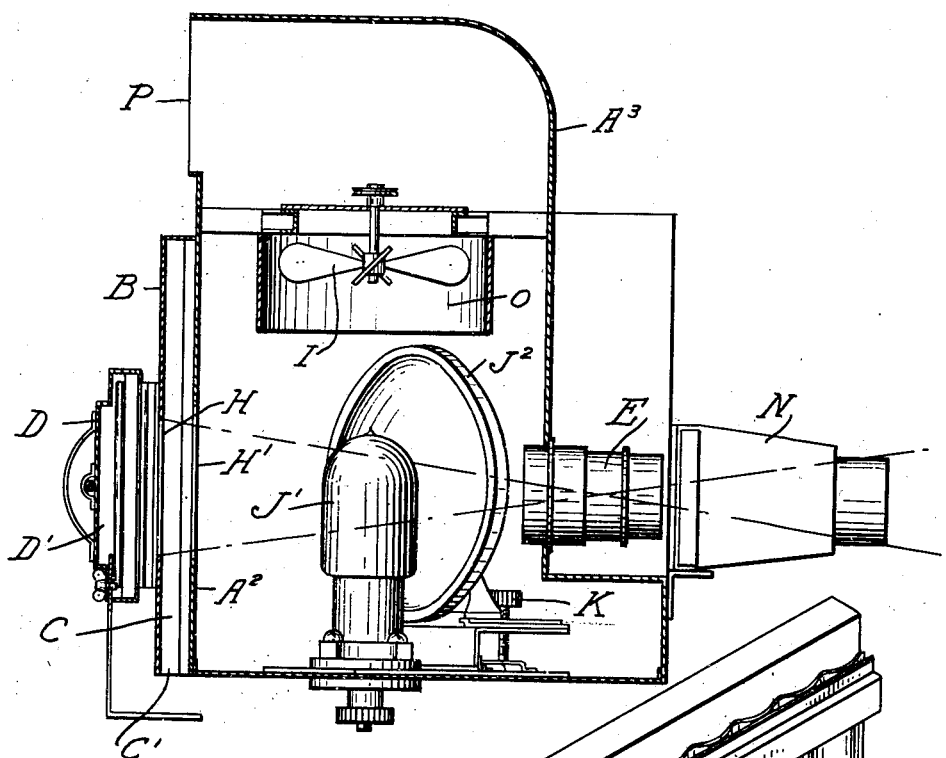

Figure 5 is a vertical sectional view through the casing, disclosing the relative position of a lamp and its reflector, the lens holders, the picture or object holder and the air propeller.

Figure 6:
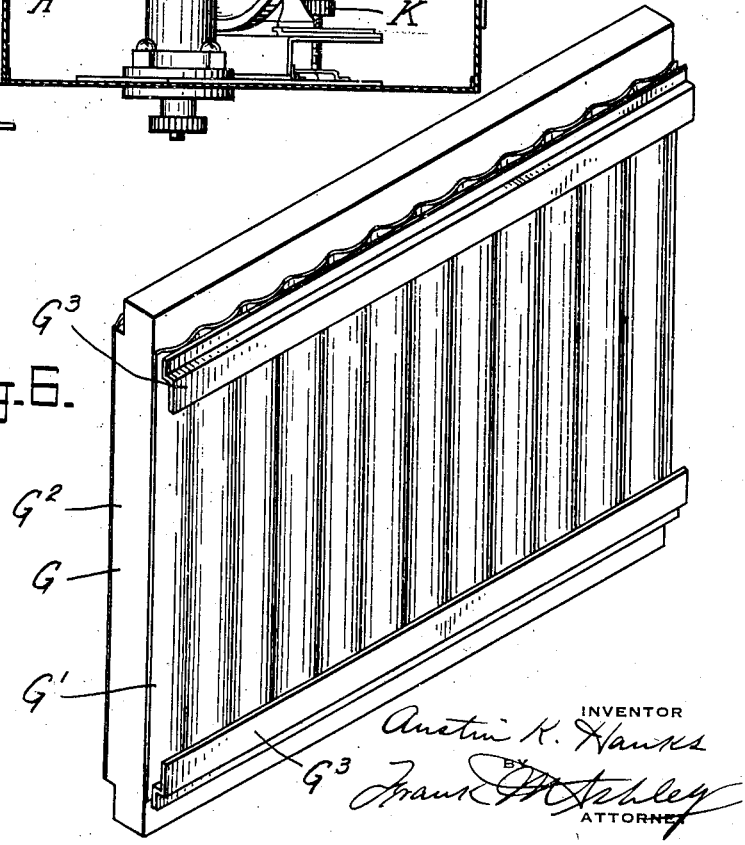

Figure 6 is a perspective view of the holder or support for the picture, print, or article to be displayed by the projection apparatus.

A indicates a casing which is generally made of sheet metal and which is supported by four legs of the same material indicated by A'—A' etc., respectively. Mounted permanently on the back of the casing is a sheet metal housing B the walls of which are spaced a short distance from the back wall A² of the casing, to provide an air conduit C which is open to the atmosphere entirely across its lower end at C' and also by holes or air passages C²—C² etc., formed in the back and sides of the housing B as illustrated.

D indicates a swinging frame, the centre of which is located diametrically opposite and in axial alignment with the lens holder E which supports the lens through which pictures are projected from opaque substances. This frame is mounted in hinged relation to the rod F on which it is mounted, and held to the frame by brackets F'—F' respectively. The lower ends of the rod F are secured to the housing by brackets F²—F² respectively, and a coil spring F³ serves to force the frame against the housing and hold it in position as shown.

The frame D is provided with openings at each end, to permit a card or object carrier G, illustrated in Figure 6, to slide in the frame and rest in exposed relation to the lens holder E, both housing and casing being provided with openings indicated by H and H' respectively to permit both light and air to pass therethrough. The card carrier G comprises a corrugated element G' fastened to a plate G² and card supporting means G³. A card held against the corrugated sheet G' would contact only with the extreme outer surface of the vertically extending corrugations and form passages for air between the back of the card and front of the corrugated sheet. Also the frame D is formed to provide an air space between the back of the plate G² and frame D, indicated by D', so that the card holder is entirely surrounded by a volume of air. A fan or blower, indicated by I is located just below the hood A³ of the casing, and is driven by a small electric motor located in the bottom of the casing, by means of a small belt I' which will be readily understood by reference to the drawings. J and J' indicate electric lamps of the concentrated filament or Mazda type to provide illumination of intense brilliancy. The lamp J and its co-operative reflector is mounted on a base plate S which rests on the bottom of the casing and adjustable to project light at an angle of about 45 deg., to the plane surface of the picture card carried in the card carrier, the light being reflected through the lens in the lens carrier E to the near side of the screen, which is a screen of translucent material on which the image is formed and viewed by observers from the far side of the screen. The lamps J and J' are both adjusted relative to the picture and lens at the proper distance and the mirrors J² and J³ are then adjusted to project the light in practically parallel rays to the picture or object to be projected on the screen, by screws K—K respectively, which act to tilt the mirrors and hold them in their proper adjusted positions. This is accomplished by providing each mirror with a bracket J⁴ which is provided with a base having a longitudinally extending groove L in each of its sides, see Figure 4, into which extend side brackets L'—L' respectively, mounted on the hinged frame M which the screw K engages. The hinged frame M is mounted on a rotatable plate S which is movable when the clamping screw T is loosened. This construction permits the mirror to be moved to or from the lamp to make the required adjustments to properly focus it with the lamp, and permits rotation of the mirror. A support or bed and lens for projecting "transparencies" is indicated by N, and the lamp J' is used for this purpose. The mirror is rotated until the mirror reflects the light through the lens held by the holder N. The axial line through the holder N is such that the lamp and lens will be in alignment with the centre of the screen so that without changing the position of the screen or projecting apparatus, either an opaque subject may be shown by projection through holder E or a transparent slide through holder N. It is to be understood that both lenses E and N will project the objects on the screen and will correctly center them thereon so that either lens will project a picture to the same position as the other.

In exhibiting opaque subjects, both lamps J and J' may be used, thus providing very high illuminating power, but in this case the heat is increased and means must be provided to protect the card. The operation is carried out as follows:—

After the screen has been placed in proper position to be viewed by an audience from the front, the apparatus is set about five feet behind the screen and the optical image focused to the center thereof. The motor is started which drives the exhaust blower I causing air to be drawn through the openings C' and C² into the housing and through the openings H and H' and upward through the tubular passageway O and exhausted through the outlet P in the hood A³, thus forming an air stream or blanket between the card and lamps which absorbs the heat from the lamps and prevents injury to the card or article supported by the card holder, and also prevents the lens from becoming overheated.

The lens holders E and N are detachable from the casing and may readily be changed to provide lenses suitable for exhibiting special subjects such as microscope slides, etc., and by reason of the air stream such slides are protected from injury to a degree heretofore unknown in so far as I am aware.

Having thus described my invention I claim as new:—

1. In an apparatus of the character described, a casing, an object holder comprising a corrugated plate, a lamp in the casing, a lens holder located opposite said object holder and means for inducing a current of air to flow between said lens holder and object holder to protect both from excessive heat generated in the lamp.

2. An apparatus of the character described comprising a casing, a housing carried on the exterior of a wall thereof and spaced from said wall, a frame attached to said housing in movable relation thereto, a lamp in said casing, an object holder carried by said frame in spaced relation from the walls thereof to provide an air space between the frame and object holder to assist in protecting the object holder from becoming overheated.

3. An apparatus of the character described comprising a casing, a housing having perforations for air carried thereby and spaced therefrom, a frame attached to said housing in swinging relation thereto, a lamp in said casing, an object holder carried by said frame in spaced relation from the walls thereof to provide an air space between the frame and object holder to assist in protecting the object holder from becoming overheated.

4. An apparatus of the character described comprising a casing, a lens holder and lens for projecting the image of an opaque object and a lens holder and lens for projecting an image of a transparent object and both arranged to form the said images at the same time and place on the screen, an object carrier, two lamps in the casing arranged to illuminate said object carrier, and one of which is located in axial alignment with the lens which projects the image of the transparent object for use in connection therewith.

5. An apparatus of the character described comprising a casing, a lens holder and lens for projecting the image of an opaque object and a lens holder and lens for projecting an image of a transparent object and both arranged to form the said images at the same place and at the same time on the screen, an object carrier, two lamps in the casing arranged to illuminate said object carrier, one of which is located in axial alignment with the lens which projects the image of the transparent object for use in connection therewith, and mechanically operated means for inducing a current of air to flow between said object carrier, lamps and lens.

6. A projection apparatus comprising a casing, a housing carried thereby and spaced therefrom, a rod hinged at its ends to said casing, a swinging frame mounted on said rod and formed to hold an object carrier, an object carrier having vertically extending corrugations and removably supported in said frame, said casing having an opening adjacent said object carrier, a lens located out of alignment with the lens and a fan for cooling said object holder.

7. An apparatus of the character described comprising a casing closed except for an inlet and an outlet opening for air, a housing connected to said casing having an opening adjacent said air inlet opening in the casing, said casing and housing contributing to form an air conduit, an object holder located adjacent said openings in the housing and casing, a lamp carried in the casing and a fan for inducing a current of air to flow through said air conduit into said casing between said object holder and lamp.

8. An apparatus of the character described comprising a casing closed except for an inlet and an outlet opening for air, a housing connected to said casing having an opening adjacent said air inlet opening in the casing, said casing and housing contributing to form an air conduit, an object holder for holding opaque substances located adjacent said openings in the housing and casing, a lamp carried in the casing, mechanically operated means for inducing a current of air to flow through said air conduit and casing between said object holder and lamp, and a reflector for said lamp adjustable relative thereto and a lens to receive and project the image of the object holder to a screen.

9. An apparatus of the character described comprising a casing, a lamp in said casing, a reflector for said lamp arranged to revolve about said lamp and adjustable relative thereto, a lens through which the light from said lamp may be directly projected to form an image on a screen, an object holder for opaque objects, a lens for projecting the image of the article held by said object holder to a screen, said lamp and reflector being located in such position relative to said object holder and last named lens that the light therefrom may be reflected from said article through said lens to form its image on said screen either independently of said first named image or simultaneously therewith to form a combined picture.

10. A projection apparatus comprising a single casing, which forms a single chamber therein, a lamp therein, a lens supported by the casing, means carried by the casing exterior to said chamber for supporting an opaque object, said casing having a single inlet opening leading from the atmosphere to said chamber located between said object holder and lens, said casing also having an outlet opening, and a fan adapted to draw air directly in front of said object holder and thence into said casing to cool the apparatus and then expel the heated air from said chamber.

11. A projection apparatus comprising a lens, casing having an opening in one side thereof, a door supported opposite said opening in swinging relation thereto and spaced therefrom and having means for supporting an opaque object exposed directly to said lens, and means for drawing air through said opening to cool said object.

12. A projection apparatus comprising a projecting lens, a lamp, and a casing having an inlet opening for air formed in one side thereof which also serves to expose the object to the projecting lens, a housing mounted on the same side of the casing and spaced therefrom and extending almost entirely over the side wall thereof and having openings therein for air to pass through and having an opening located opposite said opening in the casing, a door adapted to close said last named opening and having means for holding an object in exposed relation to said projecting lens.

13. A projection apparatus comprising a projecting lens, a lamp, and a casing having an inlet opening for air formed in one side thereof which also serves to expose the object to the projecting lens, a housing mounted on the same side of the casing and spaced therefrom and extending almost entirely over the side wall thereof and having openings therein for air to pass through and having an opening located opposite said opening in the casing, a door adapted to close said last named opening and having means for holding an object in exposed relation to said projecting lens, and mechanically operated means for drawing air through said openings in the housing, and opening in the casing, to cool said casing, object and lens.

14. In an apparatus of the character described, a casing, an object holder having an uneven surface to form air spaces between said surface and the object held in the holder, a lamp in the casing, a lens holder located opposite said object holder, and means for inducing a current of air to flow between said lens holder and object to protect both from excessive heat generated in the lamp.

15. A projection apparatus comprising a casing, a projecting lens at one side thereof, a lamp, a mirror mounted adjacent said lamp, means for tilting said mirror relative to said lamp and means whereby said mirror may be moved to and from the lamp, both of said means being mounted on a base-plate which is movable to permit rotation of the mirror relative to said lamp.

16. A projection apparatus comprising a casing, a projecting lens at one side thereof, a lamp, a mirror mounted adjacent said lamp, means for tilting said mirror relative to said lamp and means whereby said mirror may be moved to and from the lamp, both of said means being mounted on a base-plate which is movable to permit rotation of the mirror relative to said lamp, and means whereby said base-plate may be clamped to the casing.

17. An apparatus of the character described comprising a casing, an object holder including a corrugated element disposed adjacent a wall thereof, a lamp in said casing adapted to illuminate an object in said holder, means to project light rays reflected from said object to a screen, and means to induce a flow of air between said lamp and said object holder.

18. An apparatus of the character described comprising a casing having an opening in a wall thereof, an object holder mounted on the outside of said wall adjacent said opening and adapted to expose an object carried thereby at said opening, and means to cause a current of air to flow between said object and said wall of the casing and through said opening.

19. In a projection device, a casing having an aperture adjacent which a representation-bearing object is supported, a source of light in said casing, the light from said source passing through said aperture and illuminating one face of said object, and a fan rotor connected to exhaust heated air from said casing, the heated air being replaced by cool air which enters said casing through said aperture and sweeps laterally of the illuminated face of said object to cool the same.

20. In a projection device, a casing having a representation-bearing object disposed therein, a source of light in said casing for illuminating one face of said object, the wall of said casing adjacent and around said object being open to the atmosphere, and a fan rotor connected to exhaust heated air from said casing, the heated air being replaced by cool air which enters said casing through said open wall and sweeps laterally of the illuminated face of said object to cool the same.

21. In a projection device, a casing having a rear wall with an aperture therein, a perforated plate disposed exteriorly of said casing and carried by and spaced from said rear wall, a representation-bearing object supported exteriorly of said casing in alinement with said aperture, a source of light in said casing, the light from said source passing through said aperture and illuminating one face of said object, and a fan rotor connected to exhaust heated air from said casing, the heated air being replaced by cool air which passes through the perforations of said plate and enters said casing through said aperture, said cool air sweeping laterally of the illuminated face of said object to cool the same.

22. A projector having a wall with an aperture therein, an object holder supported rearwardly of said wall, a source of light disposed in front of said wall and adapted to illuminate the face of an object in said holder, and means to draw air across the face of said object from all sides thereof.

23. A projector having a wall with an aperture therein, an object holder supported rearwardly of said wall, a source of light disposed in front of said wall and adapted to illuminate the face of an object in said holder, and means to draw air across the face of said object, said holder being so constructed and arranged that a flow of cooling air is obtained across the back thereof.

24. A projector comprising a casing having a rear wall with an aperture therein, an object holder supported rearwardly of and spaced from said rear wall, a source of light disposed in said casing and adapted to illuminate an object in said holder, and means to draw air across the face of said object and through said aperture into said casing.

25. A projector comprising a casing having a rear wall with an aperture therein, an object holder supported rearwardly of said rear wall, a source of light disposed in said casing and adapted to illuminate an object in said holder, and means to draw air across the face of said object and through said aperture into said casing, said holder being so constructed and arranged that a flow of cool air is obtained across the back thereof.

26. A projector having a wall, an aperture therein, an object holder supported rearwardly of said wall, a source of light disposed in front of said wall and adapted to illuminate the face of an object in said holder, and means to draw air across the back of said object, said holder being constructed and arranged to provide a plurality of air passages at the rear of said object.

In testimony whereof, AUSTIN K. HANKS has signed his name to this specification this fifteenth day of February, 1924.

AUSTIN K. HANKS.